(12) United States Patent
Kumar et al.

(10) Patent No.: US 10,990,634 B2
(45) Date of Patent: *Apr. 27, 2021

(54) AUGMENTING SEARCH RESULTS WITH RELEVANT THIRD-PARTY APPLICATION CONTENT

(71) Applicant: Microsoft Technology Licensing, LLC, Redmond, WA (US)

(72) Inventors: Amit Kumar, Redmond, WA (US); Shajib Sadhukha, Seattle, WA (US); Michael William O'Connor, Goodyear, AZ (US); Zhaowei Jiang, PaloAlto, CA (US)

(*) Notice: Subject to any disclaimer, the term of this patent is extended or adjusted under 35 U.S.C. 154(b) by 1000 days.

This patent is subject to a terminal disclaimer.

(21) Appl. No.: 15/479,702

(22) Filed: Apr. 5, 2017

(65) Prior Publication Data
US 2017/0206282 A1    Jul. 20, 2017

Related U.S. Application Data

(63) Continuation of application No. 14/793,248, filed on Jul. 7, 2015, now Pat. No. 9,646,097, which is a
(Continued)

(51) Int. Cl.
*G06F 16/00*         (2019.01)
*G06F 16/9535*       (2019.01)
(Continued)

(52) U.S. Cl.
CPC ........ *G06F 16/9535* (2019.01); *G06F 16/248* (2019.01); *G06F 16/9038* (2019.01); *G06F 40/14* (2020.01); *G06F 40/186* (2020.01)

(58) Field of Classification Search
CPC .. G06F 16/9035; G06F 16/9535; G06F 16/95; G06F 16/953
See application file for complete search history.

(56) References Cited

U.S. PATENT DOCUMENTS 7,873,356 B2    1/2011  Flynt et al.
9,104,787 B2    8/2015  Kumar et al.
(Continued)

FOREIGN PATENT DOCUMENTS

CN    101351798 A    1/2009
WO    2012091976 A2    7/2012

OTHER PUBLICATIONS

"Second Office Action Issued in Chinese Patent Application No. 201380065169.9", dated Dec. 15, 2017, 16 Pages.
(Continued)

*Primary Examiner* — Thu Nguyet T Le
(74) *Attorney, Agent, or Firm* — Shook, Hardy & Bacon, LLP

(57) ABSTRACT

Methods, computer systems, and computer-storage media are provided for augmenting Web-based search results with relevant content received from third-party applications. Each of a plurality of third-party applications is registered to obtain an indication of entity types associated with the each registered third-party application. A user input including at least a search query is received. The search query is communicated to those third-party applications that are identified as being relevant to the search query. Search results that are relevant to the user input are received from the relevant third-party applications and are presented on a results page.

19 Claims, 6 Drawing Sheets

Related U.S. Application Data continuation of application No. 13/714,747, filed on Dec. 14, 2012, now Pat. No. 9,104,787.

(51) Int. Cl.

| | | |
|---|---|---|
| *G06F 16/248* | (2019.01) | |
| *G06F 16/9038* | (2019.01) | |
| *G06F 40/14* | (2020.01) | |
| *G06F 40/186* | (2020.01) | |

(56) References Cited

U.S. PATENT DOCUMENTS

| | | | |
|---|---|---|---|
| 2007/0156647 | A1 | 7/2007 | Shen et al. |
| 2010/0070482 | A1* | 3/2010 | Punaganti Venkata ............... G06F 16/9535 707/706 |
| 2010/0250513 | A1 | 9/2010 | Guha |
| 2010/0306191 | A1 | 12/2010 | LeBeau et al. |
| 2011/0055256 | A1 | 3/2011 | Phillips et al. |
| 2011/0252038 | A1* | 10/2011 | Schmidt ............... G06F 8/60 707/741 |
| 2011/0314004 | A1 | 12/2011 | Mehta |
| 2012/0047152 | A1 | 2/2012 | Purdy |
| 2012/0054167 | A1 | 3/2012 | Chi et al. |
| 2012/0166276 | A1 | 6/2012 | Chitnis et al. |
| 2012/0284256 | A1 | 11/2012 | Mahajan et al. |
| 2013/0218463 | A1 | 8/2013 | Howard et al. |
| 2013/0218912 | A1* | 8/2013 | Howard ............ G01C 21/3682 707/754 |
| 2013/0253832 | A1 | 9/2013 | Nallu et al. |

OTHER PUBLICATIONS

"Non-Final Office Action Issued in U.S. Appl. No. 13/714,747", dated Nov. 5, 2014, 11 Pages.

"Notice of Allowance Issued in U.S. Appl. No. 13/714,747", dated Apr. 10, 2015, 10 Pages.

"Final Office Action Issued in U.S. Appl. No. 14/793,248", dated Oct. 13, 2016, 5 Pages.

"Non-Final Office Action Issued in U.S. Appl. No. 14/793,248", dated Dec. 31, 2015, 16 Pages.

"Notice of Allowance Issued in U.S. Appl. No. 14/793,248", dated Jan. 9, 2017, 11 Pages.

Limaye, et al., "Annotating and Searching Web Tables Using Entities, Types and Relationships", In Proceedings of the VLDB Endowment, vol. 3, No. 1, Sep. 2010, pp. 1338-1347.

"International Preliminary Report on Patentability Issued in PCT Application No. PCT/US2013/074907", dated Mar. 16, 2015, 8 Pages.

"International Search Report and Written Opinion Issued in PCT Application No. PCT/US2013/074907", dated May 2, 2014, 10 Pages.

Cassidy, Mike, "An Update to Google Social Search", Published on: Feb. 17, 2011, 2 pages Available at: http://googleblog.blogspot.in/2011/02/update-to-google-social-search.html-.

Erika Chin et al., Analyzing inter-application communication in Android, Jun.-Jul. 2011, ACM, 14 pages.

"Introduction to Background Tasks", Published on: Oct. 5, 2012, 2 pages Available at: http://www.microsoft.com/en-us/downloads/details.aspx?id=27411.

"Quickstart: Adding Search to an App (Windows Store apps using JavaScript and HTML)", Retrieved on: Oct. 18, 2012, 4 pages Available at: http://msdn.microsoft.com/en-us/library/windows/apps/hh465238.aspx.

"iPhone and iPad Apps Now Searchable Through App Content Search on Lookitap.com", Published on: Jul. 19, 2012, 2 pages. Available at: http://www.prweb.com/releases/iPhone-iPad-iPhone-Touch/Apps-Content-Search/prweb9713112.htm.

Foley, Mary Jo, "Microsoft Invests in Klout; integrates Data Into Bing", Published on: Sep. 27, 2012, 5 pages Available at: http://www.zdnet.com/microsoft-invests-in-klout-integrates-data-into-bing--7000004924/.

Gold, Jon, "Uproar Over Amazon Integration into Ubuntu Search Results 'FUD,' Says Shuttleworth", Published on: Sep. 24, 2012, 4 pages Available at: http://www.networkworld.com/news/2012/092412-ubuntu-amazon-262728.htm.

European Office Action dated Apr. 4, 2017 in European Patent Application No. 13/818,572, 9 pages.

Chinese Office Action dated May 12, 2017 in Chinese Patent Application No. 13/714,747, 17 pages.

"CiBo Dictionary Version 3.0", http://www.cibo.cn, Shanghai QiBo Information Science & Technology Co., Ltd., Jun. 30, 2009. (translation not available).

\* cited by examiner

AUGMENTING SEARCH RESULTS WITH RELEVANT THIRD-PARTY APPLICATION CONTENT

CROSS REFERENCE TO RELATED APPLICATIONS

This application 15/479,702, and entitled "Augmenting Search Results with Relevant Third-Party Application Content," is a Continuation application of co-pending U.S. application Ser. No. 14/793,248, entitled "Augmenting Search Results With Relevant Third-Party Application Content," and filed Jul. 7, 2015, which is a Continuation application of U.S. application Ser. No. 13/714,747, entitled "Augmenting Search Results With Relevant Third-Party Application Content," filed Dec. 14, 2012, now U.S. Pat. No. 9,104,787 issued on Aug. 11, 2015. The disclosure of the aforementioned applications is incorporated by reference herein, in their entirety.

BACKGROUND

With the proliferation of third-party applications, or apps, on user devices there is a trend towards users fulfilling their domain-specific search needs by utilizing an app specialized for that domain instead of using a Web-based search service. For example, a user searching for nearby restaurants may go directly to his or her URBANSPOON® app to find restaurants and reviews instead of using a search service such as BING®. The result is a diversion of traffic away from Web-based search services.

Further, although search services are effective in crawling and indexing information, the information is currently limited to publicly available information. Information regarding a user's engagement history with a particular app is by and large protected through a user login and is generally not available to search services. As well, content associated with these apps is not available for consumption by Web-based search services. For example, BING® cannot crawl and index a user's EXPEDIA® itinerary. This makes it difficult for search services to fully answer user intent when providing Web-based search results.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for, among other things, augmenting Web-based search results with relevant content received from third-party applications. Third-party applications may register with a search extender service by, for example, communicating registration requests to the search extender service. Each registration request includes information about entity types or categories of information associated with the third-party application. For example, a registration request from URBANSPOON® may indicate that this app provides information concerning restaurants and restaurant reviews.

The search extender service receives annotated search queries from, for instance, search services. The annotated search queries include the original inputted search query along with information determined about the search query including entity types associated with the search query, action intents associated with the search query, and the like. Apps that have an entity type that matches the entity type associated with the inputted search query are identified, and the annotated search query is communicated to those apps. Once the apps receive the annotated search query, the apps execute the query against content associated with the app—content that is often protected and not available to Web-based search services. Those search results that answer the annotated search query are returned to the search extender service where they are aggregated and ranked based on a variety of different factors. The ranked search results are rendered using, in one aspect, predefined templates and are presented on a results page. The app search results may be presented simultaneously with Web-based search results.

Accordingly, in one embodiment, the present invention is directed to one or more computer-storage media having computer-executable instructions embodied thereon that, when executed by a computing device, cause the computing device to perform a method of augmenting Web-based search results with relevant content from third-party applications. The method comprises registering each of a plurality of third-party applications to obtain an indication of one or more entity types associated with the each registered third-party application. An annotated search query is received; the annotated search query comprises at least an inputted search query and at least one entity type determined to be associated with the inputted search query. The annotated search query is communicated to the at least a first third-party application of the plurality of third-party applications. The at least the first third-party application has an associated entity type that matches at least one entity type determined to be associated with the inputted search query. At least one search result is received from the at least the first third-party application, where the at least one search result is relevant to the inputted search query and the at least one entity type associated with the inputted search query. The at least one search result is presented on a results page.

In another embodiment, the present invention is directed to a computer system for performing a method of augmenting Web-based search results with relevant content received from third-party applications. The system comprises a data store storing one or more registration requests associated with one or more third-party applications; each registration request includes an indication of one or more entity types associated with the request's respective third-party application. The system also comprises a search extender server having one or more computer-storage media coupled with the data store. The search extender server receives annotated search queries, where each annotated search query comprises at least an inputted search query and at least one entity type determined to be associated with the inputted search query. The annotated search queries are communicated to the one or more third-party applications based on entity types associated with the one or more third-party applications. Search results relevant to the annotated search queries are received from the one or more third-party applications.

Continuing, the system further comprises one or more third-party applications associated with the one or more registration requests; each third-party application of the one or more third-party applications is configured to receive an annotated search query from the search extender server. The one or more third-party applications execute the annotated search query against at least one of local cached content or cloud-based content, and at least one search result relevant to the inputted search query and the at least one entity type associated with the inputted search query is identified. The at least one search result is communicated to the search extender server.

In yet another embodiment, the present invention is directed to a computerized method carried out by a search extender server on a user device for augmenting Web-based search results with relevant content from one or more third-party applications. The method comprises registering each of a plurality of third-party applications to obtain an indication of one or more entity types associated with the each registered third-party application. An annotated search query is received. The annotated search query comprises at least an inputted search query, an entity type determined to be associated with the inputted search query, and an action intent determined to be associated with the inputted search query. The annotated search query is communicated to the one or more third-party applications, each of the one or more third-party applications has an associated entity type that matches the entity type determined to be associated with the inputted search query. A plurality of search results is received from the one or more third-party applications, where each search result of the plurality of search results is relevant to the inputted search query and the entity type associated with the inputted search query. Additionally, at least a portion of search results of the plurality of search results includes a selectable action relevant to the action intent associated with the inputted search query. The plurality of search results is presented on a results page.

BRIEF DESCRIPTION OF THE DRAWINGS

The present invention is described in detail below with reference to the attached drawing figures, wherein.

DETAILED DESCRIPTION

Figure 1:
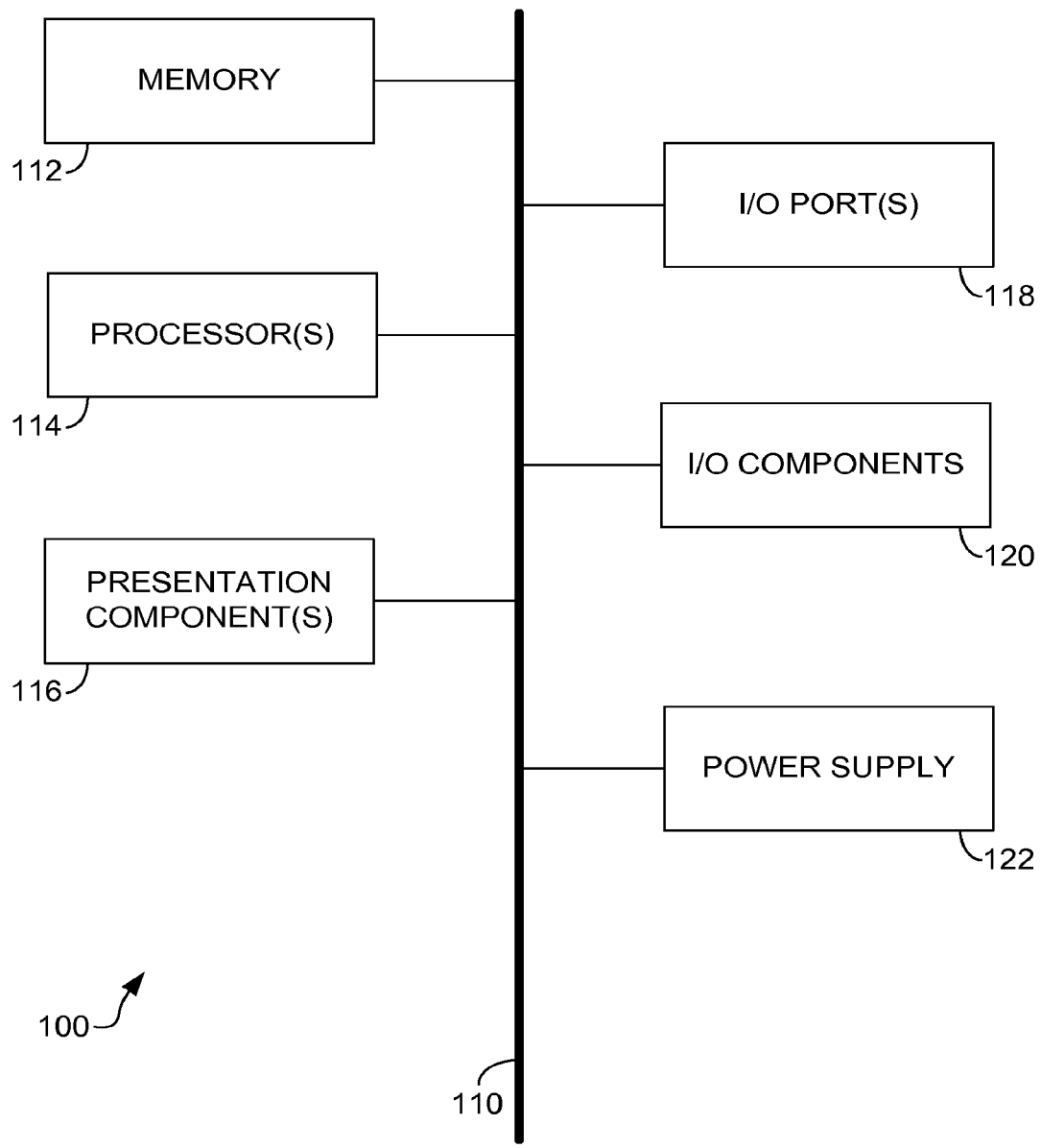
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer storage media for, among other things, augmenting Web-based search results with relevant content received from third-party applications. Third-party applications may register with a search extender service by communicating registration requests to the search extender service. Each registration request may include information about entity types or categories of information associated the with third-party application. For example, a registration request from URBANSPOON® may indicate that this app provides information concerning restaurants and restaurant reviews.

The search extender service receives annotated search queries from, for instance, search services. The annotated search queries include the original inputted search query along with information determined about the search query including entity types associated with the search query, action intents associated with the search query, and the like. Apps that have an entity type that matches the entity type associated with the inputted search query are identified, and the annotated search query is communicated to those apps. Once the apps receive the annotated search query, the apps execute the query against content associated with the app— content that is often protected and not available to traditional Web-based search services. Those search results that answer the annotated search query are returned to the search extender service where they are aggregated and ranked based on a variety of different factors. The ranked search results are subsequently rendered using, in one aspect, predefined templates and are presented on a results page. The app search results may be presented simultaneously with Web-based search results. In one aspect, one or more of the app search results are presented with a selectable action that is relevant to an action intent associated with the inputted search query. User selection of the action instantiates the app on the results page and initiates the relevant action.

The terms "third-party applications" and "apps" are used interchangeably herein and broadly pertain to application software designed to be executed by an operating system hosted on a computing device, a remote cloud-based server, or a combination of both; the application software assists the user in performing specific tasks. In operation, applications provide digital solutions in the real world, such as word processing, gaming, communication-based interfaces, etc. Examples of applications include enterprise software, accounting software, office suites, graphics software, and media players and include such popular applications as GROUPON®, SHAZAM®, OPENTABLE®, YELP®, and the like. It should be understood and appreciated that the definition of applications is not limited to the scope of examples provided herein and may include any code that carries out one or more operations when executed.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant, a smart phone, a tablet PC, or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excludes signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

Furthermore, although the term "server" is often used herein, it will be recognized that this term may also encompass a search service, a search extender service, a Web browser, a cloud server, a set of one or more processes distributed on one or more computers, one or more stand-alone storage devices, a set of one or more other computing or storage devices, a combination of one or more of the above, and the like.

Figure 2:
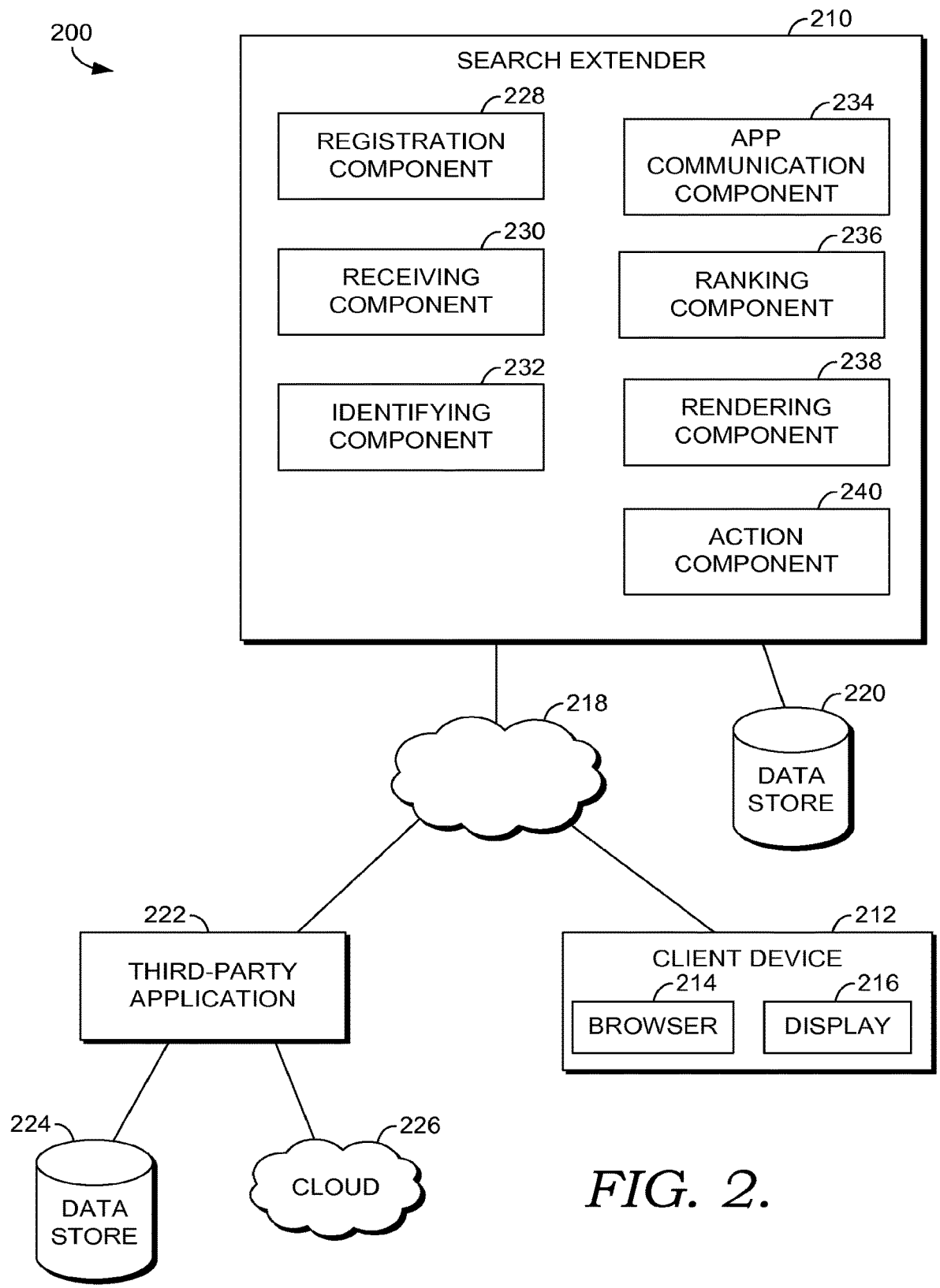
FIG. 2 is a block diagram of an exemplary system for augmenting Web-based search results with relevant content received from third-party applications suitable for use in implementing embodiments of the present invention.

Referring now to FIG. 2, a block diagram is provided illustrating an exemplary computing system 200 in which embodiments of the present invention may be employed. Generally, the computing system 200 illustrates an environment in which Web-based search results are augmented with relevant content or search results received from third-party applications. The content received from the apps is relevant not only to the inputted search query but also to, among other things, entity types and action intents determined to be associated with the inputted search query. Content such as this helps to more fully answer user intent as compared to application results that simply match keywords or letters in a search query.

Among other components not shown, the computing system 200 generally includes a client device 212, a third-party application 222 and its associated data store 224 and cloud-based content 226, and a search extender service 210, all in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

It should be understood that any number of client computing devices, third-party applications, and search extender services may be employed in the computing system 200 within the scope of embodiments of the present invention. Each may comprise a single device/interface or multiple devices/interfaces cooperating in a distributed environment. For instance, the search extender 210 may comprise multiple devices and/or modules arranged in a distributed environment that collectively provide the functionality of the search extender 210 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 212, as an Internet-based service, or as a module inside the search extender 210. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search extenders, or client computing devices. By way of example only, the search extender 210 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 212 may include any type of computing device, such as the computing device 100 described with reference to FIG. 1, for example. Generally, the client computing device 212 includes a browser 214 and a display 216. The browser 214, among other things, is configured to render search home pages (or other online landing pages), and render results pages in association with the display 216 of the client computing device 212. As used throughout this application, the term "results page" is meant to encompass Web pages such as search engine results pages, and result pages associated with search applications, either standalone or embedded in other applications (e.g., Xbox®, Microsoft® Office, and the like). Applications such as these may present search results in association with a Web page or may present search results on other types of pages such as dialog boxes.

The browser 214 is further configured to receive user input of requests for various web pages (including search engine home pages), receive user inputted search queries (generally inputted via a user interface presented on the display 216 and permitting alpha-numeric and/or textual input, voice input, and/or gesture input into a designated search box), and to receive content for presentation on the display 216, for instance, from the search extender 210. The browser 216 may be any suitable type of Web browser such as Internet Explorer®, Firefox®, Chrome®, Safari®, or other type of software configured to enable submission of search queries as disclosed herein. It should be noted that the functionality described herein as being performed by the browser 214 may be performed by any other application capable of rendering Web content. Any and all such variations, and any combination thereof, are contemplated to be within the scope of embodiments of the present invention. The display 216 is configured to present various content including, without limitation, browser pages, search engine home and result pages, and/or third-party application pages. In embodiments, the display 216 is further configured to enable touch inputs, auditory inputs, and/or gesture inputs from a user.

In one aspect, the third-party application 222 (or "app" 222) is locally installed on, for example, the client device 212 and utilizes the operating system and system resources of the client device 212 to effectuate its processing tasks. In another aspect, the app 222 comprises a "virtual app" or "cloud-based app" that utilizes one or more remote cloud servers to perform some or all of its processing tasks. Access to the virtual app may be through a browser such as the browser 214 or through an app icon that acts as a browser to connect to the cloud server. Any and all such variations, and any combination thereof, are contemplated to be within the scope of embodiments of the present invention.

The app 222 is configured to communicate with the search extender 210 in order to, for instance, send registration requests to the search extender 210, receive annotated search queries from the search extender 210, and to send search results relevant to annotated search queries along with additional information to the search extender 210. The additional information may include an identity of a user associated with the app 222, uniform resource locators (URLs) directed to various pages within the app 222, a user engagement history with the app 222, actions and associated URLs associated with the app 222, and/or rendering information. The rendering information may include templates, and/or branding or logo information that may be used to help render the search results.

In one aspect, the app 222 is further configured to communicate to the search extender 210 one or more entity types or categories of information associated with the app 222. By way of example, an ANGIE'S LIST® app may specify that it is associated with entity types such as "household repairs," and "referrals." In general, an entity refers to a real-world item that is tangible or intangible, and an entity type refers to a common attribute shared by one or more entities or to a category of information. For example, "James Bond" and "Bilbo Baggins" both are entities that share the common attribute of "movie characters" and/or "movies." Thus, "movies" and "movie characters" are considered entity types. The app 222 may communicate an indication of entity type in a registration request communicated to the search extender 210. In another aspect of the invention, the search extender 210 may be configured to discover app entity type information by crawling Web sites and identifying markup language specifying entity types associated with third-party applications. Any and all such variations, and any combination thereof, are contemplated to be within the scope of embodiments of the present invention.

The app 222 is also configured to execute searches using, for example, the annotated search query while remaining in the background. In other words, the searches are executed without the app 222 being instantiated and coming to the foreground of the client device 212 potentially disrupting user activities. The searches conducted by the app 222 may be executed against local cached content stored in association with the data store 224. As well, the searches may be executed against data stored in a location remote from, for example, the client device 212; this remote location is represented by the cloud 226. Any and all such variations, and any combination thereof, are contemplated to be within the scope of embodiments of the present invention. Content associated with the data store 224 and/or the cloud 226 may include user identifying information, search results, user engagement history with the app 222, entity types associated with the app 222, actions and action URLs associated with the app 222, rendering information, and the like. This content is generally protected behind a set of user credentials (e.g. user login identification) and is not typically accessible to a search service. The app 222 is configured to carry out the activities described above without sharing the user's private credentials with the search extender 210.

As illustrated, the search extender 210 includes a registration component 228, a receiving component 230, an identifying component 232, an app communication component 234, a ranking component 236, a rendering component 238, and an action component 240. In some embodiments, one or more of the components 228, 230, 232, 234, 236, 238, and 240 may be implemented as stand-alone applications. In other embodiments, one or more of the components 228, 230, 232, 234, 236, 238, and 240 may be integrated directly into the operating system of a computing device such as the computing device 100 of FIG. 1 or the client device 212. It will be understood that the components 228, 230, 232, 234, 236, 238, and 240 illustrated in FIG. 2 are exemplary in nature and in number and should not be construed as limiting. Any number of components may be employed to achieve the desired functionality within the scope of embodiments hereof. The search extender 210 may be implemented as a plug-in application to a browser such as the browser 214. In another aspect, the search extender 210 may be a stand-alone application on the client device 212. Further, the functionality associated with the search extender 210 may be turned on or off according to user preference.

The illustrated search extender 210 also has access to a data store 220. The data store 220 is configured to store information for use by, for example, the search extender 210. The information stored in association with the data store 220 is configured to be searchable for one or more items of information stored in association therewith. The information stored in association with the data store 220 may comprise general information used by the search extender 210. For example, the data store 220 may store information concerning recorded search behavior of users in general, and, when permitted, a log of a particular user's search behavior.

The data store 220 may also store information concerning the apps that have registered with the search extender 210. Such information may include the location of the app 222 on the client device 212. For instance, whether a particular app has been "pinned" or placed on a home screen of the client device 212, or if an app has been moved to a more accessible page on the client device 212. The information may also include known ratings information about the apps and entity types associated with the different apps. Additionally, the data store 220 may store information regarding user engagement with app search results. Such information is myriad but some representative examples may include the identity of apps frequently used to answer search queries directed to a particular entity type, whether a user initiates a deep launch action using an app result, the amount of time a user spends on a particular app or app result, and, if the information is available, whether a user completed a purchase after selecting an app result. This information may be used by the search extender 210 to adjust ranking of search results received from third-party applications such as the app 222. Further, the data store 220 may store app search results for frequently executed search queries.

The content and volume of such information in the data store 220 are not intended to limit the scope of embodiments of the present invention in any way. Further, though illustrated as a single, independent component, the data store 220 may, in fact, be a plurality of storage devices, for instance, a database cluster, portions of which may reside on the search extender 210, the client device 212, and/or any combination thereof.

The registration component 228 of the search extender 210 is configured to receive registrations requests from apps, such as the app 222, and store the registration requests in association with the data store 220. In order to register with the search extender 210, an app, such as the app 222, should be able execute appropriate search tasks while remaining in the background. In one aspect, apps are registered after the user has given permission for the registration. Permission may be granted on an app-by-app basis at the time of installation of the app, or a one-time permission applicable to all apps may be granted by the user.

Each app's registration request received by the registration component 228 may include an indication of entity types associated with the app. As mentioned, entity types associated with an app may be thought of as categories of information associated with the app. Some illustrative examples of entity types include movies and TV shows with NETFLIX®, restaurants and reviews with URBANSPOON®, pictures with INSTAGRAM®, social networking information with FACEBOOK®, and the like. Registration requests may also include information concerning the app's capabilities, use conditions, user privacy and preference parameters, requests for information such as search result usage information, and the like. Entity types associated with apps may also be determined based on information extracted from crawling Web sites. For instance, a Web page may have content detailing different types of applications and the information categories associated with each. Any and all such variations, and any combination thereof, are contemplated to be within the scope of embodiments of the present invention.

The receiving component 230 of the search extender 210 is configured to receive annotated search queries. Annotated search queries may be received from a search service or may be provided by a third-party source. The search service may include an Internet search engine or a database search engine. These search engines are well known in the art, and commercially available engines share many similar processes not further described herein. The annotated search query includes the original search query inputted by the user along with any annotations added by, for example, the search service or third-party source. The inputted search query may be annotated with a variety of information including entity types associated with the inputted query. By way of illustrative example, the search query "Norah Jones," may be annotated with entity types such as "singer," "female singer," and "jazz artist." As can be seen, a single inputted search query may be annotated with multiple entity types. An inputted search query may also be annotated with one or more action intents determined to be associated with the query. In another illustrative example, the query, "car rental" may be annotated with the action intent of "reservation." Other annotated information includes a location of the user who inputted the query, suggested query terms, suggested query completions, related search queries, search results returned using traditional Web-based searching, search advertisements found by normal search actions, a user identity if permitted by the user, search result usage information, and a search session history of users in general or a particular user's search session history if permitted by the user.

The identifying component 232 is configured to identify one or more apps, such as the app 222, that have an associated entity type that matches the entity type determined to be associated with the inputted search query. This may be done by, for example, accessing the registration requests stored in association with the data store 220 to identify entity types associated with the request's respective app. This may also be accomplished by accessing app entity type information extracted from Web sites and stored in association with the data store 220. An app's entity type may match the search query entity type if the entity types share some commonality. For example, an app's entity type may comprise "restaurant reviews," and the search query entity type may comprise "restaurants." Even though there is not an exact match, the app would still be identified as matching the search query entity type.

The app communication component 234 is configured to communicate the annotated search query to those apps identified by the identifying component 232. By communicating the annotated search query to only those apps identified as having entity types that match the search query entity type, traffic to and from the apps is reduced which, in turn, reduces latency in presenting search results as well as demand on the battery power of the computing device. This can be especially important in the case of smart phones that already face significant demands on battery power. In one aspect, the app communication component 234 communicates all of the information contained within the annotated search query to an app, while in another aspect only a portion of the information contained within the annotated search query is communicated to an app. This decision may be based on parameters specified by the app concerning app capabilities, user privacy and preference parameters, and information requests.

The app communication component 234 is further configured to receive search results along with additional information from the apps, such as the app 222. The search results are received after the app executes the annotated search query against its content. The search results are structured around the inputted search query and any annotations associated with the search query. In one aspect, the app search results are formally structured using, for example, HTML tags according to schema.org standards. For example, if the search query includes an entity type, the app search results are structured such that they answer the inputted search query along with the entity type. In this instance, the app search results may also include appropriate actions typically associated with the search query entity type. In another example, if the search query includes an entity type and an action intent, the search results are structured such that they answer the inputted search query, the entity type, and the action intent. An app search result may answer an action intent by including a selectable action that enables the user to directly navigate to the action (via a URL) within the app. Structuring app search results to answer not only the search query but any annotations associated with the search query helps to more fully address user intent as compared to providing app results directed solely to the original query or to portions of the original query. The additional information received by the app communication component 234 may include the identity of the user associated with the app, relevant user engagement history with the app, and rendering information such as templates or branding information.

The app communication component 234 is configured to receive app search results asynchronously. In one aspect, an app result received outside of a predetermined time frame may not be presented on the results page. The app communication component 234 is also configured to discard any app search result that is incomplete (e.g., lacks information that meets the user intent as evidenced by the annotated search query). Additionally, the app communication component 234 is configured to verify the source of the search result to determine that it is a legitimate app result and not a third-party phishing attempt.

The ranking component 236 is configured to aggregate the search results received from the apps, such as the app 222, and rank the search results. App search results may be aggregated around entity types and/or action intents. For example, in response to a search query of "Montana travel," app search results, including actions, may be aggregated around entity types such as "points-of-interest," and "maps." Actions associated with the "points-of-interest" entity type may include "buy tickets," or "make a reservation," and actions associated with "maps" may include "download now."

With respect to ranking, the first time a search result is received from an app, the ranking of the result may be based on, for example, the user engagement history with the app as indicated by the app. Thus, if the app indicates frequent user involvement, then the app search result may be ranked higher as compared to a search result from an infrequently used app. The initial ranking may be modified based on subsequent user interactions with the app search results. A user's frequent interaction or selection of a particular app's search results will improve the ranking of subsequent search results received from that app.

The ranking component 236 also analyzes more granular interactions with the search results. For example, the ranking component may analyze user engagement with an app based on entity type and action intent associated with the inputted search query. By way of illustrative example, a user may frequently interact with a AAA app result when booking car rentals but interact with an EXPEDIA® app when booking airline travel. This is true, even though both apps may provide information related to travel. Thus, the next time the user inputs a search query that has an action intent directed to "car reservations," the AAA app result would be ranked higher than the EXPEDIA® app result.

The ranking component 236 is also configured to analyze other signals when determining ranking of app search results. Search results from an app that is pinned to the user's home page may be ranked higher than search results from an app that is located on a subsequent page of the user's device. In another example, search results from an app that has been moved from a later page to an earlier page may also be ranked higher. Other signals include the amount of time a user spends on an app after it has been launched from an app search result, and, if the information is available, whether the user completed a purchase after selecting an app result. These are just a few examples of factors used by the ranking component 236. The ranking component 236 is further configured to use traditional signals know in the art in its relevance and ranking algorithms. Any and all such variations, and any combination thereof, are contemplated to be within the scope of embodiments of the present invention.

Based on engagement history with the app search results, the app communication component 234 may refrain from subsequently communicating annotated search queries to certain apps even though those apps have a specified entity type that matches the entity type of the inputted search query. For instance, if a user rarely engages with AAA app results, the app communication component 234 may no longer communicate travel-related search queries to the AAA app.

The rendering component 238 is configured to communicate app search results along with rendering information to, for example, a search service which subsequently renders the results and present the results on a results page. The rendering information may include predefined templates provided by the search extender 210 along with rendering information provided by, for example, the app 222. The templates may include a title area for the name of the app, a message area to present search result information (including branding or logo information) received from the app, and, optionally, an action area for presenting a selectable action associated with the app search result. In one aspect, the app search results may be rendered simultaneously with algorithmic Web-based search results. The app search results may be presented in an area separate from the Web-based search results on the results page or may be interweaved with the Web-based search results. In another aspect, based on user preference, the app search results may be presented on a results page without Web-based search results. Any and all such variations, and any combination thereof, are contemplated to be within the scope of embodiments of the present invention.

The action component 240 is configured for a number of different things. For example, once rendered and presented on the results page, a user can launch the app associated with the app search result via the action component 240 by selecting the search result. Selection of the app result instantiates the app to a page or location within the app that answers the user's intent as evidenced by the annotated search query. For example, selection of a URBANSPOON® app result returned in response to the search query "Thai restaurants," would launch the app to a page in the app directed to Thai restaurants. For those app search results that include a selectable action, selection of the app result launches the corresponding app to a page or location within the app that answers the user's action intent as evidenced by the annotated search query. For instance, selection of a AAA search result returned in response to the search query "car rental," would launch the app to a reservations page where the user could reserve a car. In some aspect, the action within the app is automatically initiated when the app result is selected. By way of example, selection of a NETFLIX® app result with the action of "Download," returned in response to the search query "Transformers," would launch the app and initiate the automatic downloading of the Transformer's movie to the user device. Any and all such variations, and any combination thereof, are contemplated to be within the scope of embodiments of the present invention.

Apps may be launched so that the app page overlays a portion of the results page enabling the user to simultaneously view content associated with the results page and the app page. In this instance, the app can be dismissed by selection of any area on the results page (e.g., a "light-dismiss). In another aspect, the app may be launched full screen.

Figure 3:
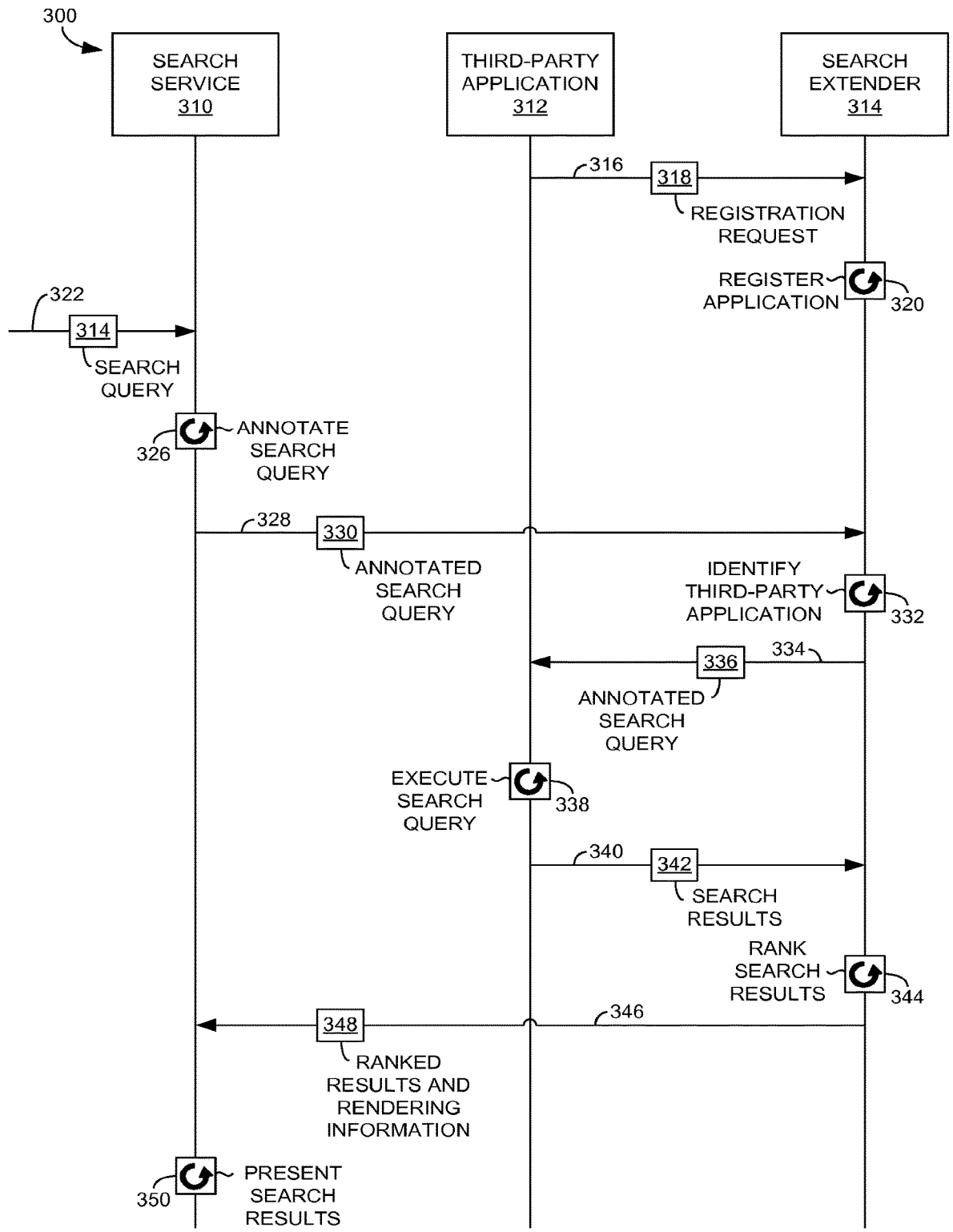
FIG. 3 is a process-flow diagram illustrating an exemplary process for communicating annotated search queries to specified third-party applications and receiving search results relevant to the annotated search queries in accordance with an embodiment of the present invention.

Turning now to FIG. 3, a process-flow diagram, referenced generally by the numeral 300, is depicted illustrating a method of augmenting Web-based search results with relevant content from third-party applications. FIG. 3 includes a search service 310, a third-party application 312 (the "app" 312), and a search extender 314.

The search service 310 may include traditional search engines such as BING® or GOOGLE® as well as database search engines known in the art. The app 312 includes any app downloaded by a user. Although only one third-party application is depicted, it is contemplated that there may be numerous third-party applications. The app 312 may be locally installed on the user's device or may comprise a virtual app that operates partially or completely utilizing remote cloud-based servers. The app 312 may correspond to the app 222 of FIG. 2. The search extender 314 may correspond to the search extender 210 of FIG. 2.

At a step 316, a registration request 318 is communicated from the app 312 to the search extender 314. The registration request 318 may include entity types or categories of information associated with the app 312 along with information concerning the app's capabilities, use conditions, user privacy and preference parameters, information requests, and the like. At a step 320, the search extender 314 registers the app 312. The search extender 314 may store the app's registration request and its associated information in association with a data store such as the data store 220 of FIG. 2.

At a step 322, the search service 310 receives a search query 324. The search query 324 may have been explicitly inputted by a user using a search box, or the search query 324 may be an implicit search query determined by monitoring user interactions with a browser and/or Web pages. At a step 326, the search query 324 is annotated by the search service 310 with different types of information using methods known in the art. Search queries may be annotated with entity types, action intents, related search queries, suggested search queries, spell-corrected search queries, algorithmic search results, relevant advertisements, user identities, search session usage information, search history information, and the like.

At a step 328, the now annotated search query 330 is communicated from the search service 310 to the search extender 314. At a step 332, the search extender 314 identifies one or more apps that have an indicated entity type that matches the entity type determined to be associated with the annotated search query 330. At a step 334, the annotated search query (now labeled as annotated search query 336) is communicated from the search extender 314 to the app 312. In some aspects of the invention, only a portion of the information associated with the annotated search query 336 is communicated to the app 312. For example, if the app 312 has indicated that its app capabilities only support returning search results structured around entity types and not action intents, the action intent associated with the annotated search query 336 may not be communicated to the app 312.

At a step 338, the app 312 executes the annotated search query 336 against one or more of local cached content or cloud-based content to generate one or more search results. This content is generally protected behind a set of user credentials and is not typically accessible to the search service 310. At a step 340, the app 312 communicates app search results 342 to the search extender 314. The app search results 342 are structured to answer the annotated search query 336. For instance, the app search results 342 answer not only the inputted search query but also entity types, action intents, and other information associated with the inputted search query. By way of illustrative example, the inputted search query may have been annotated with information regarding the user's search history that indicates that the user spends a lot of time looking for discounts or deals. Besides answering the annotated search query 336 in terms of entity types and/or action intents, the search results 342 may also include a discount even though the inputted search query did not indicate that the user was seeking a discount. In one aspect, the search results 342 may be formally structured using HTML tags.

The search results 342 may also include additional information supplied by the app 312. The additional information may include a user identity if not previously known, relevant user engagement history with the app 312, uniform resource locators associated with actions and/or entities within the app 312, rendering information, and the like.

At a step 344, the app search results 342 are aggregated and ranked. The search results 342 may be aggregated around entity types and/or actions. Ranking is based on numerous factors including user engagement history with the app 312, previous user engagement history with the app results 342, location of the app 312 on the user device (e.g., if the app is located on the home page or a readily-accessible page), external ratings information associated with the app 312, and the like.

At a step 346, ranked app search results and rendering information 348 are communicated from the search extender 314 to the search service 310. The rendering information may include predefined templates as well as rendering information received from the app 312 (e.g., branding or logo information). At a step 350, the search service 310 renders and presents the app search results on a results page. In one aspect, the results may be presented simultaneously with algorithmic Web-based search results, while in another aspect, the results may be presented by themselves on the results page. If presented in conjunction with Web-based search results, the app search results may be presented in a separate area or may be interwoven with the traditional search results. Any and all such variations, and any combination thereof, are contemplated as being within the scope of the invention.

Figure 4:
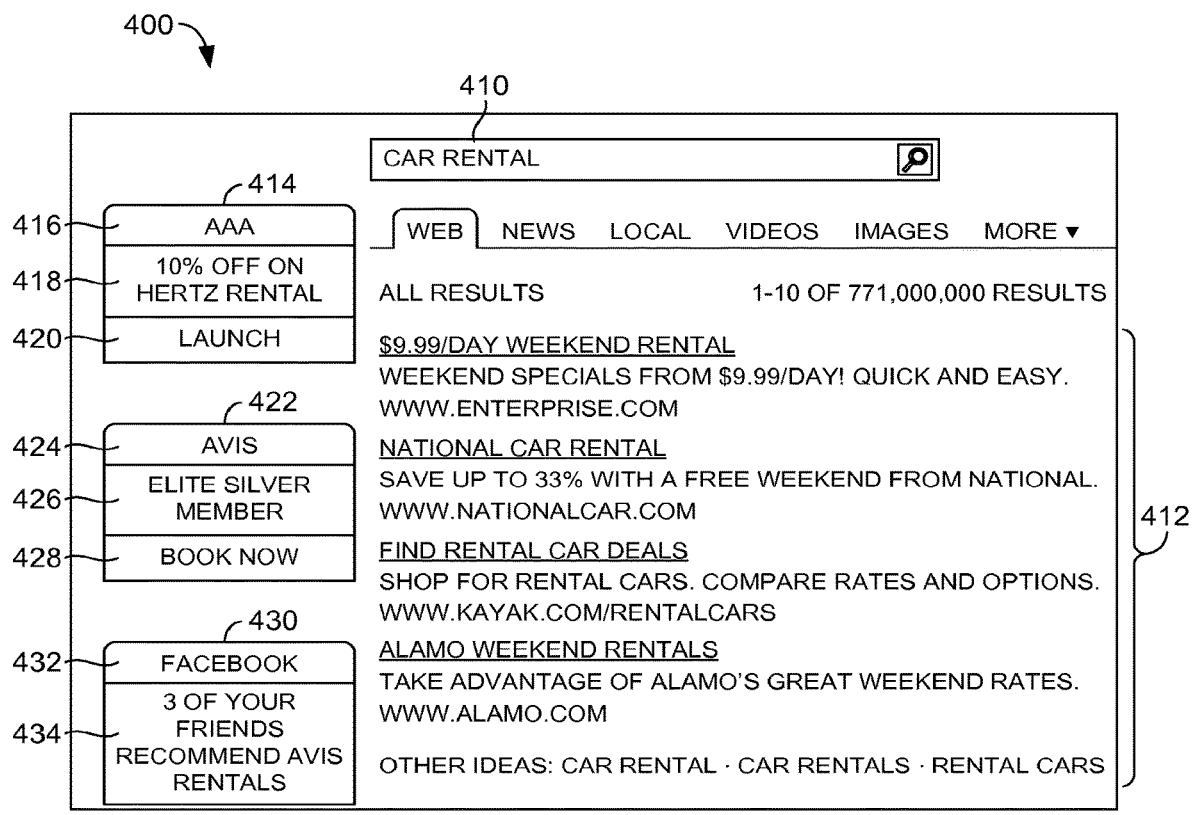
FIG. 4 is an exemplary graphical user interface illustrating a search engine results page that includes traditional Web-based search results and relevant content from third-party applications in accordance with an embodiment of the present invention.

FIG. 4 depicts a graphical user interface (GUI) illustrating an exemplary presentation of application search results on a results page such as a search engine results page. FIG. 4 depicts a results page 400 that includes a search query input area with a search query 410, a set of Web-based search results 412, and app search results 414, 422, and 430. The Web-based search results 412 have been algorithmically determined to be relevant to the inputted search query 410 "car rental" using methods known in the art. The app search results 414, 422, and 430 have been returned by third-party applications associated with the user device and are relevant to the inputted search query 410 as well as any annotated information that is associated with the search query 410. The app search results 414, 422, and 430 are presented in a ranked order using factors outlined above. The results page 400 illustrates the app search results 414, 422, and 430 presented in a separate area as compared to the Web-based search results 412.

App search result 414 has been rendered using a predefined template that includes a title area 416 that presents the name of the app (e.g., AAA), a message area 418 for presenting at least a portion of the search result relevant to the annotated search query (e.g., "10% off on Hertz rental"), and an action area 420 that presents a selectable action (e.g., "Launch"). The message in the message area 418 not only answers the inputted search query 410, but also answers at least a portion of the annotated information associated with the query 410. For instance, the annotated information might include indications from the user's search history that the user frequently seeks discounts or bargains. This information is passed from the search extender to the AAA app, which, in turn, structures search results to meet this type of user intent. The user is able instantiate the AAA app by selecting any portion of the search result 414, for example the "launch" area 420. The AAA app is launched to a page corresponding to the car rental discount.

The app search result 422 is also rendered using a predefined template with a title area 424 (e.g., "Avis"), a message area 426 (e.g., "Elite Silver Member"), and an action area 428 (e.g., "Book Now"). The message in the message area 426 may be presented in response to annotated information associated with the inputted search query 410 that identifies the user who inputted the search query. Armed with the user's identity, the AVIS® app can search its database and determine that the user is an "Elite Silver Member." The action in the action area 428 is relevant to an action intent determined to be associated with the inputted search query 410. Like above, the user can launch the AVIS® app by selecting the app result 422. If the user wishes to initiate the "Book Now" action, the user can select the action area 428. Selection of the action area 428 either takes the user to a page within the AVIS® app that enables the user to complete this action, or, alternatively, automatically and without user intervention initiates the "Book Now" action. Any and all such variations, and any combination thereof, are contemplated as being within the scope of the invention.

The app search result 430 has been returned by the social media site FACEBOOK® and is rendered using a predefined template that include a title area 432 and a message area 434. In this case, an action has not been returned with the search result 430, but the message in the message area 434 is still relevant to the annotated search query. For example, the message addresses the inputted search query, the user' identity, and entity type. Again, the FACEBOOK® app can be launched by selecting the search result 430.

The presentation of the app search results 414, 422, and 430 in FIG. 4 is for illustration purposes only. It is contemplated that app search results may be presented in a number of different ways without departing from the spirit and scope of the described invention. For instance, app search results may be interwoven with Web-based search results. App search results may also be aggregated and presented by entity type and/or by action. Aggregating and presenting app search results by entity type and/or action reduces navigation burdens for the user.

Figure 5:
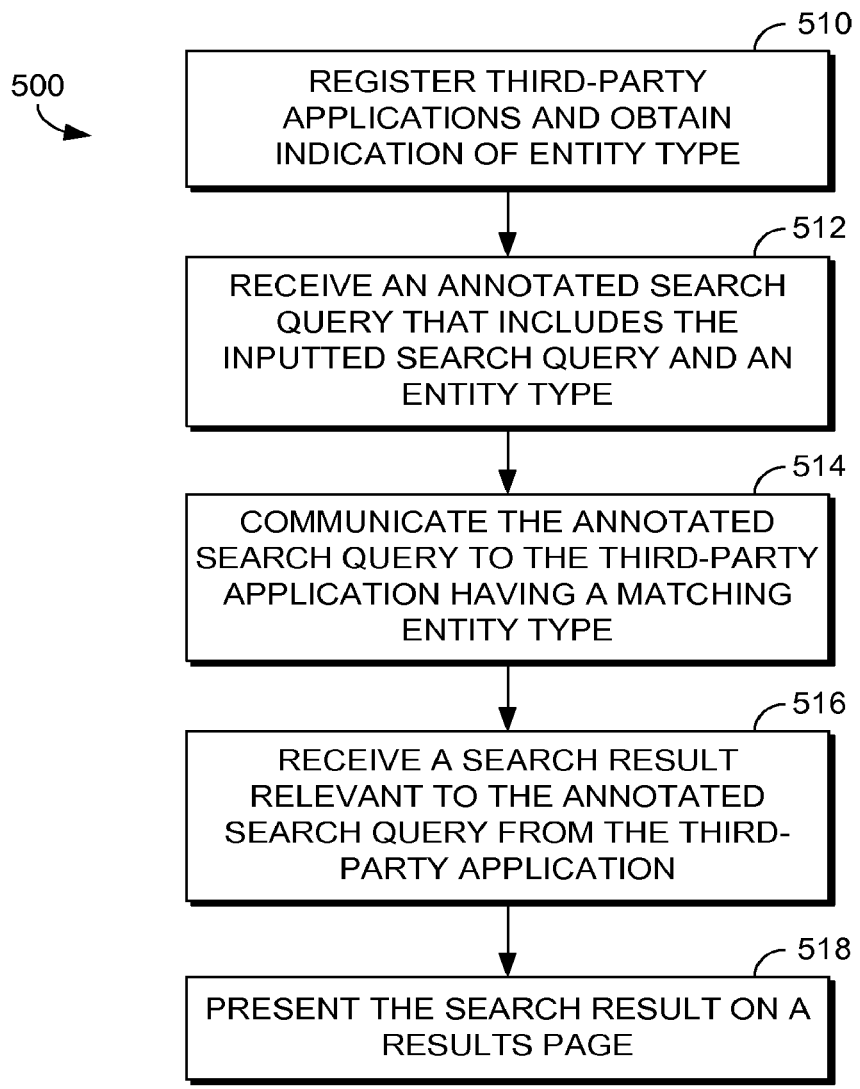
FIGS. 5-6 are flow diagrams that illustrate exemplary methods of augmenting Web-based search results with relevant content received from third-party applications in accordance with embodiments of the present invention.

Turning now to FIG. 5, FIG. 5 depicts a flow diagram of an exemplary method 500 of augmenting Web-based search results with relevant content from third-party applications. At a step 510, each of a plurality of third-party applications are registered to obtain an indication of entity types associated with each of the apps. Registration may occur through the receipt of registration requests by a registration component of a search extender service such as the registration component 228 of the search extender 210 of FIG. 2. Each registration request may include an indication of entity types associated with the request's respective third-party application. The registration requests may also include information concerning app capabilities, use conditions, user privacy and preference parameters, requests for information such as search result usage information, and the like. The registration requests may be stored in association with a data store such as the data store 220 of FIG. 2. Indications of app entity types may also be obtained by extracting app entity type information from Web sites. Registration may occur subsequent to a verification step where the identity of the app is verified by the search extender.

At a step 512, an annotated search query is received; the annotated search query may be received from a search service or a third-party source by a receiving component such as the receiving component 230 of FIG. 2. The annotated search query includes an original inputted search query and an entity type determined to be associated with the inputted search query. The annotated information may additionally include, for example, action intents associated with the inputted search query, a location of a user who inputted the search query, related search queries, Web-based search results determined for the inputted search query, advertisements related to the inputted search query, an identity of the user who inputted the search query (if permitted), and/or a search history or usage information associated with users in general and/or the user who inputted the search query.

At a step 514, the annotated search query is communicated to a third-party application that has an entity type that matches at least one of the entity types associated with the inputted search query. The communication may occur via an app communication component such as the app communication component 234 of FIG. 2. Entity types may be identified as matching if there is some degree of commonality between the entity types. For example, the entity types may broadly pertain to the same category of information. In some aspects, only a portion of the annotated information is communicated to an app. This may be based on information provided by the app concerning, for example, app capabilities, use conditions, user privacy and preference parameters, and/or information requests.

At a step 516, search results relevant to the annotated search query are received from one or more of the third-party applications by the app communication component. The search results are structured to answer the annotated search query and, in one aspect, may be formally structured using hypertext markup language (HTML) tags according to, for example, schema.org standards. The search results may include additional information such as the identity of the user associated with the app, a user engagement history with the app, actions and associated URLs, and rendering information.

At a step 518, the search results are presented on a result page. Prior to presentation, the results may be rendered using predefined templates that include areas for the title of the app, the search result, and any actions associated with the search result. The results may also be rendered using rendering information such as logo or branding information provided by the app. The search results may be presented simultaneously with Web-based search results and may be interwoven with the Web-based results or presented in an area separate from the Web-based results. In another aspect, the results page may include only the app search results.

Figure 6:
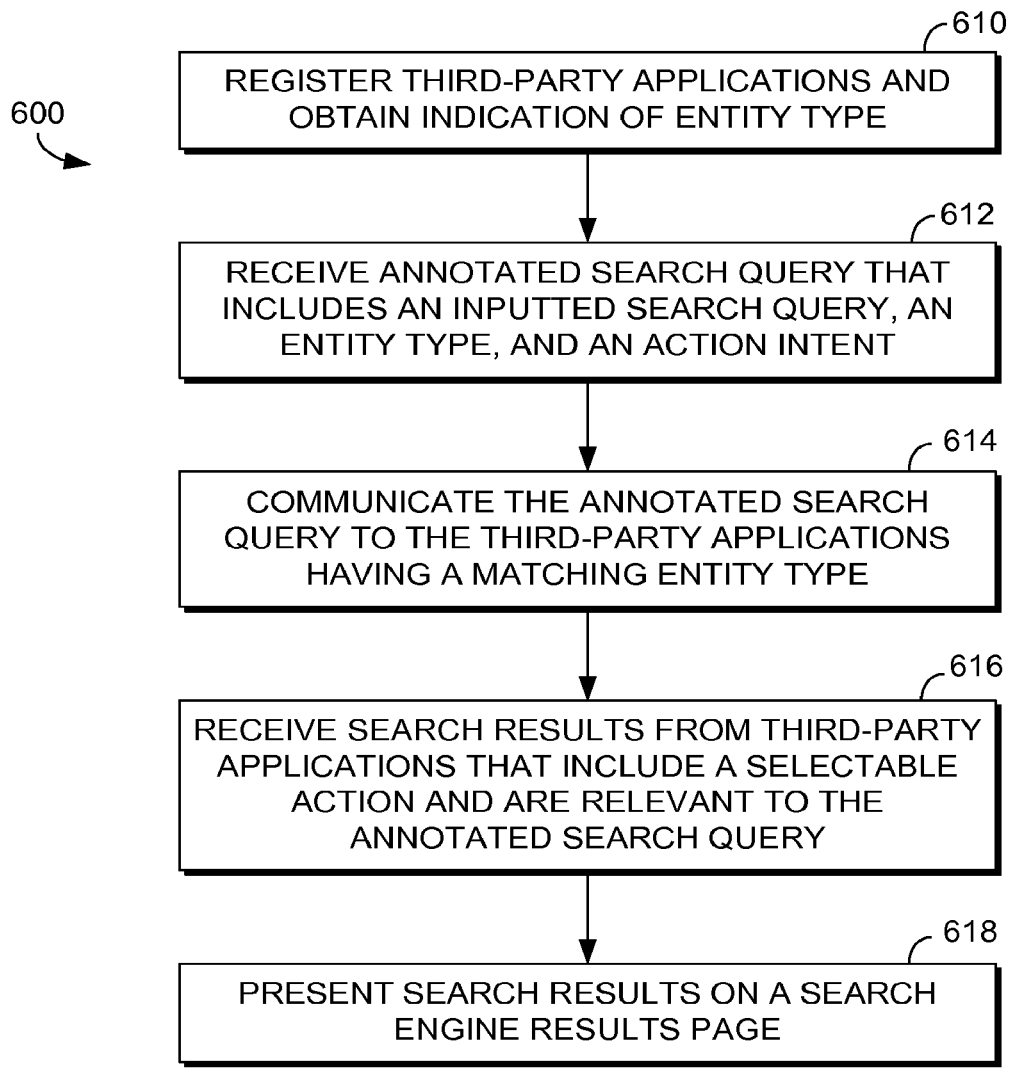

FIG. 6 depicts a flow diagram of an exemplary method 600 of augmenting Web-based search results with relevant content received from third-party applications. At a step 610, each of a plurality of third-party applications is registered to obtain an indication of one or more entity types associated with the app. Registration may occur via a registration request communicated from the app to a search extender such as the search extender 210 of FIG. 2. An indication of entity type associated with an app may be part of the registration request or may be obtained through other methods such as accessing entity type information stored in association with a data store (e.g., the data store 220 of FIG. 2) or querying Web sites for app entity type information.

At a step 612, an annotated search query is received. The annotated search query includes at least the original inputted search query, one or more entity types determined to be associated with the inputted search query, and one or more action intents determined to be associated with the inputted search query. The annotated information may include additional information as outlined above.

At a step 614, the annotated search query is communicated to those apps that have an indicated entity type that matches the entity type associated with the search query. At a step 616, search results are received from the apps; the search results are structured such that they answer the annotated search query. For example, at least a portion of the search results may include a selectable action that answers the action intent determined to be associated with the inputted search query.

At a step 618, the app search results are presented on a results page as outlined above. Prior to presenting the app search results, the search results may be aggregated by a ranking component such as the ranking component 236 of FIG. 2. Search results may be aggregated around entity type and/or actions. After aggregation, the search results are ranked by the ranking component. Initial ranking of the search results may be based on, for example, information provided by the apps regarding frequency of user interaction with the apps. Initial ranking may also be based on other signals such as app ratings information provided by external sources, and/or a location of the app on the user's device (e.g., whether the app is on the home page or a readily-accessible page, etc.). Subsequent ranking of app search results may be based on user interactions with the app search results. Such interactions may include time spent on a particular result, selection of a result, selection of an action associated with a result, time spent on an application launched from a result, and, where the information is available, whether a user completed a purchase after launching the app. Again, prior to presentation, the ranked results are rendered using predefined templates and, optionally, rendering information provided by the apps.

The method 600 may further comprise receiving a selection of an app search result selectable action, launching the associated third-party application, and initiating the action within the third-party application. In one aspect, the action may be automatically initiated, while in another aspect, the user is presented with an application page that enables the user to complete the action.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer-storage devices accessible by a computing device having computer-executable instructions embodied thereon that, when executed by the computing device, cause the computing device to perform a method of augmenting Web-based search results with relevant content received from third-party applications, the method comprising:
    registering each of a plurality of third-party applications along with one or more entity types for each of the third party applications;
    receiving an indication of a user input comprising at least one search query determined to be associated with the user input;
    determining an entity type associated with the at least one search query, wherein the entity type refers to a common attribute shared by one or more entities;
    receiving search results from a first third-party application of the plurality of third-party applications, wherein the search results are relevant to the at least one search query and the entity type associated with the at least one search query, and wherein the first third party application is associated with the entity type;

ranking the search results from the first third-party application prior to presentation of the search results on a search results page, wherein the search results from the first third-party application is ranked based on a user engagement history with the first third-party application; and presenting the search results from the first third-party application on a results page according to the ranking.

2. The one or more computer-storage devices of claim 1, wherein the one or more entity types for each of the plurality of third party applications correspond to one or more categories of information.

3. The one or more computer-storage devices of claim 1, wherein the first third-party application is installed locally on the computing device.

4. The one or more computer-storage devices of claim 1, wherein the first third-party application is a cloud-based application.

5. The one or more computer-storage devices of claim 1, further comprising receiving additional information from the first third-party application, the additional information comprising one or more selected from the following:
an identity of a user associated with the first third-party application;
user engagement history with the first third-party application;
actions and associated uniform resource locators that are relevant to the user input; and
rendering information.

6. The one or more computer-storage devices of claim 5 further comprising rendering the search results utilizing the rendering information and a predefined template.

7. The one or more computer-storage devices of claim 1, wherein Web-based search results associated with the user input are presented with the search results on the results page.

8. The one or more computer-storage devices of claim 7, wherein the search results from the first third-party application are presented in a first area of the results page and the Web-based search results are presented in a second area of the results page, the first area being separate from the second area.

9. A computer system for performing a method of augmenting Web-based search results with relevant content received from third-party applications, the system comprising:
one or more computer-storage devices comprising a data store, the data store storing one or more registration requests associated with one or more third-party applications;
a search extender server coupled with the data store, wherein the search extender server:
1) receives one or more user inputs comprising at least one search query;
2) determines an entity type associated with the at least one search query, wherein the entity type refers to a common attribute shared by one or more entities; and
3) receives from the one or more third-party applications, search results relevant to the at least one search query and the entity type associated with the at least one search query;
wherein the search extender server associates the one or more third party applications with the entity type;
wherein the one or more third-party applications associated with the one or more registration requests are configured to identify at least one search result relevant to the one or more user inputs and communicate the search results to the search extender server;
wherein the search results from the one or more third-party applications are ranked based on a user engagement history with the one or more third-party application prior to presenting of the search results on a results page; and
a rendering component configured for presentation of the search results received from the one or more third-party applications on the search results page as ranked.

10. The system of claim 9, wherein the search results is identified using at least one of local cached content or cloud-based content.

11. The system of claim 9, wherein the search extender server further monitors user engagement with search results received from the one or more third-party applications and adjusts ranking of the search results based on the user engagement.

12. The system of claim 9, wherein the search extender server asynchronously receives from the one or more third-party applications the search results relevant to the one or more user inputs.

13. The system of claim 9, wherein the search extender server sends one or more annotated search queries associated with the one or more user inputs to the one or more third-party applications, wherein the annotated search queries further comprise at least one action intent.

14. A computerized method carried out by a search extender server having at least one processor on a user device, for augmenting search results with relevant content from one or more third-party applications, the method comprising:
registering each of a plurality of third-party applications along with one or more entity types for each of the third party applications;
receiving a user input comprising at least a search query;
determining an entity type associated with the search query, wherein the entity type refers to a common attribute shared by one or more entities;
subsequent to receiving the user input, receiving one or more search results relevant to the search query and the entity type associated with the search query from one or more third-party applications that are associated with the entity type;
ranking the search results from the one or more third party applications prior to presentation of the search results on a results page, wherein the search results from the one or more third-party applications are ranked based on a user engagement history with the one or more third-party applications; and
presenting the search results from the one or more third-party applications according to the ranking.

15. The method of claim 14, wherein at least a portion of the search results from the one or more third-party applications includes a selectable action relevant to an action intent associated with the user input, and wherein the method further comprises receiving a user selection of the selectable action associated with the portion of the search results received from the one or more third-party applications.

16. The method of claim 15, further comprising monitoring subsequent user selections with the portion of the search results including the selectable action.

17. The method of claim 16, adjusting a ranking of the search results based on the subsequent user selections with the portion of the search results including the selectable action.

18. The method of claim 17, wherein subsequent to receiving the user selection of the selectable action of the portion of the search results including the selectable action, a third-party application associated with the selected selectable action is presented.

19. The method of claim 18, wherein the third-party application associated with the selected selectable action is dismissible.

\* \* \* \* \*